(12) United States Patent
McNair

(10) Patent No.: US 6,414,254 B1
(45) Date of Patent: *Jul. 2, 2002

(54) ELECTRICAL PRESSURE SENSING SWITCH

(75) Inventor: John Duncan McNair, Hong Kong (HK)

(73) Assignee: Chiaphua Industries Limited, Hong Kong ( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/418,891

(22) Filed: Oct. 15, 1999

(51) Int. Cl.[7] ................................................ H01H 35/38

(52) U.S. Cl. .................................. 200/82 R; 200/82 C

(58) Field of Search .............................. 200/82 C, 82 R, 200/573

(56) References Cited

U.S. PATENT DOCUMENTS

| | | | | |
|---|---|---|---|---|
| 3,766,833 A | * | 10/1973 | Kraemer | 92/37 |
| 3,766,834 A | * | 10/1973 | Kraemer | 92/35 |
| 3,786,211 A | * | 1/1974 | Popp | 200/83 T |
| 4,110,575 A | * | 8/1978 | Meisenheimer, Jr. | 200/81.9 R |
| 5,162,624 A | * | 11/1992 | Duksa | 200/81.9 M |

* cited by examiner

*Primary Examiner*—P. Austin Bradley
*Assistant Examiner*—Lisa N. Klaus
(74) *Attorney, Agent, or Firm*—Jackson Walker L.L.P.

(57) ABSTRACT

An electrical pressure sensing switch for a pressure cooker comprises a plunger slidably and sealingly mounted in a lid of a cooking vessel. The plunger is moved towards one end of a pivoted lever when pressure rises inside the vessel. The other end of the lever is positioned to press down against an operating arm. When the force applied by the plunger as a result of higher pressures in the vessel is sufficient to overcome bias of a spring, the arm is moved down by the lever. This results in operation of micro-switches. Embodiments of the invention are mechanically simple and accommodate wide tolerances without loss of calibration, while necessary electrical parts are separated or separable from the lid to facilitate cleaning and washing.

3 Claims, 2 Drawing Sheets

ELECTRICAL PRESSURE SENSING SWITCH

BACKGROUND OF THE INVENTION

1. Field of the Invention

The invention relates to electrical pressure sensing switches.

2. Description of the Prior Art

The invention relates more particularly to such switches that respond to changes in pressure in a sealed heating vessel, and especially although not exclusively to an electrically heated pressure cooker. At present, pressure sensing switches have several disadvantages including being prone to contamination by food particles, say, that hinder their operation, requiring careful assembly, are difficult to clean (e.g. when required to be submerged in water), and require many relatively expensive components capable of withstanding high pressures.

SUMMARY OF THE INVENTION

It is an object of the invention to overcome or at least reduce some or all these problems.

According to the invention there is provided an electrical pressure sensing switch for an enclosed heating vessel comprising a plunger slidably sealed to and extending through a wall of the vessel, and a biassed operating arm mounted outside the vessel arranged to mechanically resist movement of the plunger out of the vessel, and electrical switch means operable in response to predetermined degrees of movement of the lever against its bias caused by the plunger.

The plunger is preferably mounted in a removable lid of the vessel.

The plunger is preferably supported by flexible bellows shaped sealing elements.

An externally mounted pivoted lever may be arranged to mechanically connect between one end of the plunger and the operating arm. The lever may be pivotable supported by a frame mounted to or formed on a lid of the vessel.

The lever may be evenly balanced either side of its pivoting axis.

The operating arm may comprise an operating arm of a micro-switch.

The operating arm may be made of flexible material and resilient bias arises due to the inherent mechanical resistance to flexing of the operating arm.

The operating arm may comprise a cylinder biassed by a spring, including at least one micro-switch that is mounted to be switched by mechanically bearing against a part of the cylinder when the cylinder is moved by the plunger. Means for altering the bias may be provided by the spring. The means for altering the bias may comprise a manually rotatable cam that bears on a movable platform supporting the spring against the operating arm such that rotation of the cam can increase and decrease compression of the spring.

BRIEF DESCRIPTION OF THE DRAWINGS

Electrical pressure sensing switches according to the invention will now be described by way of example with reference to the accompanying drawings in which.

DESCRIPTION OF THE PREFERRED EMBODIMENTS

Figure 1:
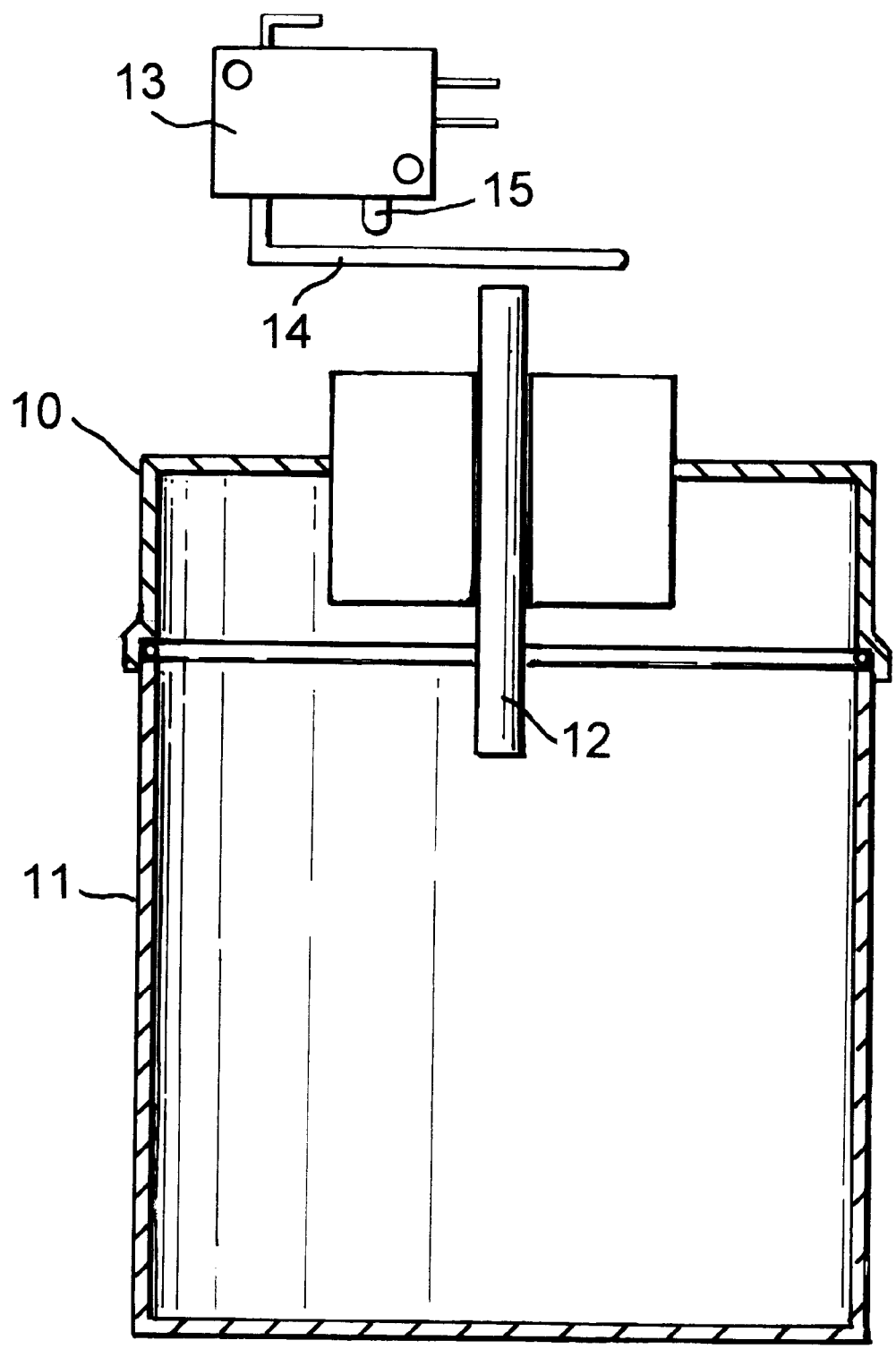
FIG. 1 is a schematic drawing of one of the switches.

Referring to the drawing, in FIG. 1 in a wall 10 of a sealed heating vessel 11 is sealingly mounted a slidable plunger 12.

A micro-switch 13 includes a biassed operating arm 14. When pressure in the vessel rises above atmospheric pressure, the plunger 12 is urged out of the vessel and bears against the arm 14. When the pressure rises above a predetermined higher value, the plunger 12 is forced, by the corresponding increased pressure in the vessel acting on a lower end of the plunger, against the arm to overcome the bias of the arm 14 to press the arm against a switch button 15 and to operate the micro-switch 13.

In principle, the force generated by air pressure acts on the lower surface of the plunger 12 with the same force whatever is the relative (height) position of the plunger. The actual force generated can be increased or decreased by increasing or decreasing the effective surface area of the lower surface of the plunger. Thus initially, it is irrelevant what the actual displacement is between the upper end of the plunger and the arm 14. As the pressure in the vessel rises above atmospheric pressure the plunger 12 urged upwards so as to touch against the arm 14. At some predetermined value, the force against the lower surface of the plunger will become sufficient to urge the plunger further upwards and to overcome the (downward) bias of the arm 14 so as to operate the micro-switch 14.

It will be appreciated that the downward bias may be provided inherently by using a fixed arm 14 made of resilient material, or by incorporating a biassing spring (not shown) inside the micro-switch 14, for example.

Figure 2:
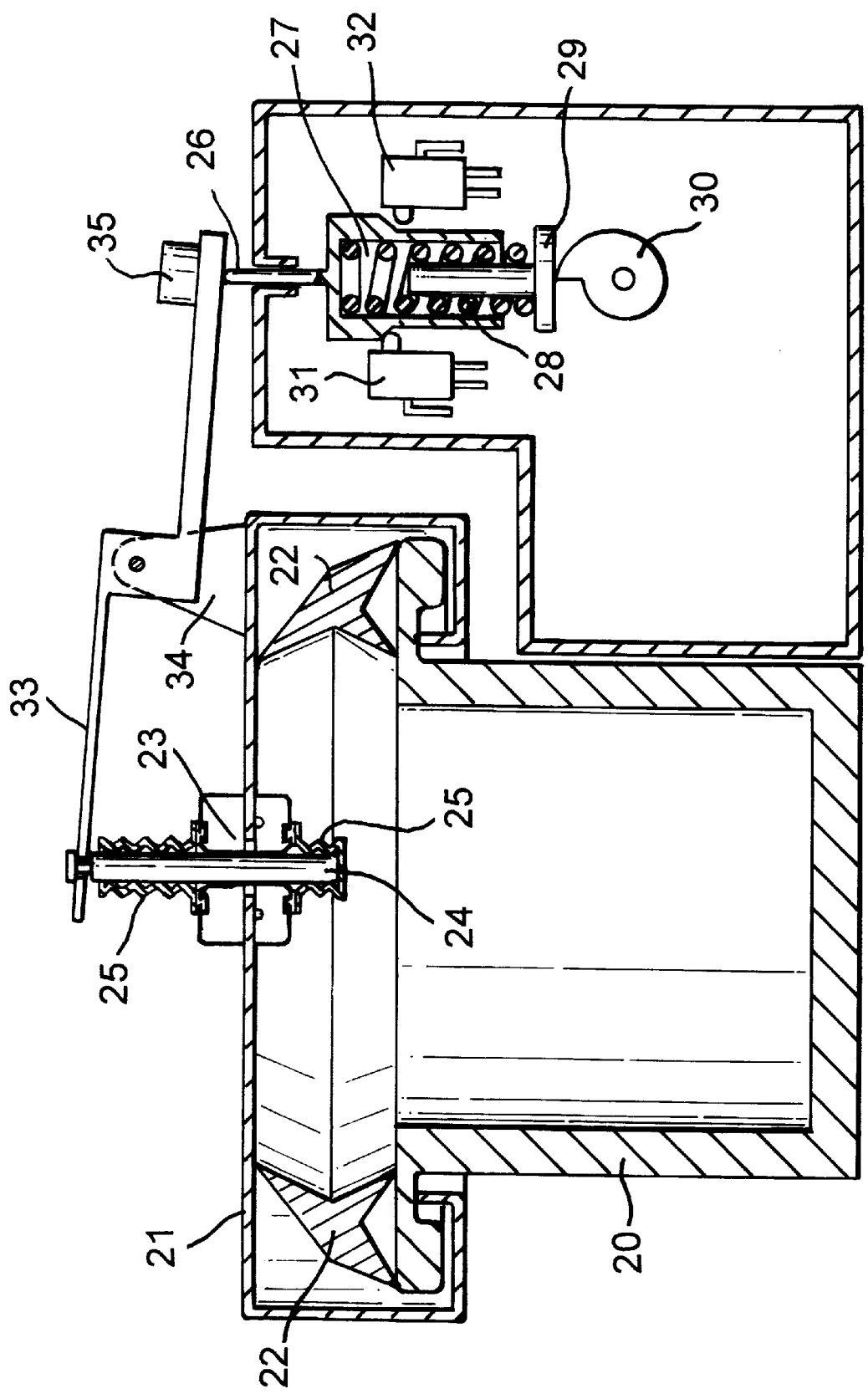
FIG. 2 is a schematic drawing of another of the switches.

In FIG. 2, a pressure cooking vessel 20 has a removable lid 21 and sealing ring 22. The lid 21 has an aperture 23 through which a plunger 24 can readily slide. The plunger 24 is supported in the lid 21 by low-force bellow type seals 25. An operating arm 26 of an electrical switch arrangement extends to form a lower cup-shaped chamber 27 that contains a coil spring 28. A platform 29 supports and locates the spring 28 inside the chamber 27. The spring applies an upward force to the operating arm 26, which force can be altered by manual rotation of a cam surface 30 that raises or lowers the platform 29. An outer surface of the chamber 27 is configurated to urge against and to operate two micro-switches 31 and 32 whenever the arm 26 is moved down, as will be explained below.

A pivoted lever 33 supported a frame 34 that is mounted on or formed on the lid 21 has a counter-weight 35 at one end. The lever is balanced and so in the described configuration the lever simply transfers actual forces applied between its ends and introduces no or minimal mechanical forces. Where applicable the lever may be much longer at one side of its pivot point to introduce a mechanical advantage in use so that a smaller force, say, generated by the plunger 24 can overcome a larger bias of the arm 26, or vice versa.

In use, the pressure sensitive switch of FIG. 2 operates in the same manner as the switch described with reference to FIG. 1. That is to say, when pressure inside the cooking vessel 20 first rises above atmospheric pressure, the plunger 24 slides to touch against the lever 33. However, as soon as this pressure reaches a first predetermined higher value, the force applied to the lower surface of the plunger 24 will be sufficient to overcome the bias of the spring 28, via mechanical lever 33, and so move the arm 26, and its chamber 27, downwards to the position shown in FIG. 2. As a result the micro-switch 31 will be operated to visually or otherwise indicate a certain pressure has been reached inside the vessel 33. Typically the micro-switch will be arranged to turn OFF an electrical heating power supply to the vessel 20.

If the pressure rises further, the arm 26 will be urged further downwards in the same way, and the micro-switch 32 will be operated. Thus, in the described arrangement of FIG. 2, the pressure sensing switch is capable of sensing two pre-set pressure values inside the vessel 21. The second value may be set and used to raise an alarm, for example. Clearly, further micro-switches, or other mechanically operated switching means, or sensors, could be positioned to be pressed against or otherwise initiated by movements of the arm 26.

Various practical benefits arise from the described and other embodiments of the invention. It will be appreciated that the sensing of pressure will not usually be affected by "contamination" adjacent the plunger, consisting of particles of food for example where used in association with a pressure cooker. The vessel and/or lid are also easily cleaned and washed without interference with any electrical components which can be separate and separable from the vessel or lid.

Further, as the actual initial separation between the plunger and the operating arm (or the level in the case of FIG. 2) does not affect the operation, calibration and effective use, there is no need for close-tolerance assembly of the sensing switches. In FIG. 2, the lever may be "loosely" mounted (i.e. dropped or slotted into position, for example) and the sensing switch easily assembled and disassembled, and components certainly removed from the lid 21 for cleaning and storage, if required. Twisting or bending of the lever during normal use will not alter the pre-set operating values at all, or hardly at all. Despite the possibility of high pressures being involved in the heating vessels, relatively low pressure (and low force) components can be used satisfactorily. Simple electrical switches can be used to provide indications of or responses to various sensed pressures. The calibration and/or settings are simply and widely variable, especially in the arrangement of FIG. 2.

As already mentioned, the effective surface areas of the plungers 11 and 24 can be altered by choosing thicker or thinner plungers. The springs or other biassing provided for the operating arms can be easily changed, or manually adjusted as in FIG. 2. A mechanical advantage can be provided by pivoting the lever 33 "off-centre". The plungers 12 and 24 may be mounted in a sidewall of the vessel, if preferred.

I claim:

1. An electrical pressure sensing switch for an enclosed heating vessel comprising:

a plunger slidably sealed to and extending through a wall of the vessel;

a biassed operating arm mounted outside the vessel arranged to rest against an end of the plunger and to mechanically resist movement of the plunger out of the vessel caused by gas pressure applied to the plunger in the vessel that is above a predetermined value higher than atmospheric pressure, the operating arm further comprising:

a cylinder biassed by a spring, including at least one micro-switch that is mounted to be switched by mechanically bearing against a part of the cylinder when the cylinder is moved by the plunger; and electrical switch means operable in response to predetermined degrees of movement of the operating arm against its bias caused by the plunger.

2. An electrical pressure sensing switch for an enclosed heating vessel comprising a plunger slidably sealed to and extending through a wall of the vessel, and a biassed operating arm mounted outside the vessel arranged to mechanically resist movement of the plunger out of the vessel, the operating arm further comprising a cylinder biassed by a spring, including at least one microswitch that is mounted to be switched by mechanically bearing against a part of the cylinder when the cylinder is moved by the plunger, and electrical switch means operable in response to predetermined degrees of movement of the operating arm against its bias caused by the plunger.

3. An electrical pressure sensing switch for an enclosed heating vessel comprising:

a plunger slidably sealed to and extending through a wall of the vessel;

a biassed operating arm mounted outside the vessel arranged to mechanically resist movement of the plunger out of the vessel caused by gas pressure applied to the plunger in the vessel that is above a predetermined value higher than atmospheric pressure, the operating arm further comprising:

a cylinder biased by a spring including at least one micro switch that is mounted to be switched by mechanically bearing against a part of the cylinder when the cylinder is moved by the plunger; and electrical switch means operable in response to predetermined degrees of movement of the operating arm against its bias caused by the plunger.

* * * * *